United States Patent [19]
Molenaar et al.

[11] 3,800,690
[45] Apr. 2, 1974

[54] COFFEE FILTERING

[75] Inventors: Albert Meijlom Molenaar, Terkaple; Melle Veenstra, Joure, both of Netherlands

[73] Assignee: Douwe Egberts Koninklijke Tabakseabriek-Koffiebranderijen-Theehandel N.V., Utrecht, Netherlands

[22] Filed: Dec. 15, 1971

[21] Appl. No.: 208,098

[30] Foreign Application Priority Data
Sept. 7, 1971  Netherlands .................... 7112303

[52] U.S. Cl. .................................. 99/295, 99/306
[51] Int. Cl. .................................................. A23f
[58] Field of Search ............ 99/298, 292, 293, 295, 99/304, 306

[56] References Cited
UNITED STATES PATENTS
| | | | |
|---|---|---|---|
| 1,636,179 | 7/1927 | Gehlert | 99/306 |
| 1,680,519 | 8/1928 | Houck | 99/306 |
| 1,964,151 | 6/1934 | Guntrup | 99/306 |
| 3,139,344 | 6/1964 | Weisman | 99/295 |

*Primary Examiner*—Robert W. Jenkins
*Attorney, Agent, or Firm*—Baldwin, Egan, Walling & Fetzer

[57] ABSTRACT

A coffee filtering system having a single percolation, using a compressed coffee tablet in a closely fitting holder.

5 Claims, 3 Drawing Figures

COFFEE FILTERING

The invention relates to a coffee filtering method with a single filtration, as well as to a coffee filter for applying this filtering method and to a pressed tablet of ground coffee suitable for applying this method, while use may be made of such a coffee filter.

The object of the invention is to provide an improved coffee filtering method with a single filtration, with a coffee brew of very high quality and a high extraction yield and which is particularly also suitable for application in a disposable filter system.

To this end it is proposed to apply a compressed tablet of roasted and ground coffee, the coffee tablet being kept in contact with preheated water for moistening the coffee tablet during a first period without percolation of water, after which the extraction of the coffee takes place during a second period while the desired quantity of water percolates through the ground coffee.

SUMMARY OF THE INVENTION

By employing a pressed coffee tablet and opposing the percolation of water through the tablet for a certain time, there is time for the water to moisten the coffee, during which soluble constituents of the coffee are already released. After that, with the percolation of the water, the extraction period of the coffee begins. A coffee brew prepared in this manner appears to have particularly good flavor properties. A compressed tablet guarantees in all conditions an even filtering, while a brewing time within narrow limits can be maintained. Without the inconvenience of dusting, use can be made of very finely ground coffee, which will improve the quality of the brew.

It has appeared that good results are obtained if the first period takes about one quarter of the total brewing time and the second period the remaining three quarters of this brewing time, the total brewing time being between 2 and 6 minutes, more particularly between 4 and 5 minutes. The latter case corresponds with a moistening period of about 1 minute.

According to the invention, a coffee filter for applying the filtering method of the present invention has a holder for ground coffee with filter bottom, which holder is so constructed that on top of it a reservoir for a certain quantity of preheated water can be arranged and which can be suitably positioned above a collecting basin for the coffee brew, the holder for ground coffee being adapted to receive and embrace a compressed tablet of roasted and ground coffee. On account of the fact that the coffee tablet is embraced in the holder, it is prevented that poured water oozes between the wall of the holder and the tablet without taking part in the moistening and extraction of the coffee, while owing to the density of the tablet the water is stopped during the moistening time. Although the embrace of the coffee tablet in a given place is sufficient to prevent oozing of water, it has appeared to be efficient to construct the holder in such a manner that a coffee tablet is clamped over a slight height along the lower edge of the periphery and is kept spaced from the filter bottom. Owing to this the tablet can freely expand on all sides, except for the embraced portion of slight height. During the moistening phase the coffee brew swells and the tablet disintegrates. To receive the expanding coffee brew the holder for ground coffee is constructed with approximately three times the volume of the compressed coffee tablet.

It is observed that in dependence on the type of coffee used and the expansion thereof a larger or smaller volume of the holder can be used. If the holder is too small the brew does not sufficiently disintegrate and the oozing of the water is hampered while in case of too large a volume all the brew is not sufficiently extracted. To promote disintegration the tablet is kept spaced from the filter bottom.

To insure a correct and accurate brewing time the percolating time of the water is preferably determined by the coffee tablet itself and not for instance by the filter element arranged therebelow. Owing to the use of pre-compressed coffee a much coarser filter bottom than usual can be applied, the only requirement being that the pore size is just sufficiently small to prevent passage of the swollen moistened coffee particles almost completely.

To obtain a good moistening of the coffee tablet and to prevent the swollen coffee brew from floating in the water reservoir, there is preferably arranged between the water reservoir and the coffee holder a grid having openings narrowing towards the interior of the coffee holder, the smallest opening being in the order of 0.2–0.5 mm. Gas present in the extraction chamber must be able to escape. To promote the gas discharge, steps as defined herebelow can be taken.

The invention will be elucidated with reference to the drawing showing some embodiments of a coffee filter.

BRIEF DESCRIPTION OF THE DRAWING

In this drawing:

FIG. 1 shows a coffee tablet 1 received in a holder 2 for ground coffee, said holder being provided at the bottom with a filter bottom 3. The coffee tablet 1 is retained in the holder 2 by lugs 4. Above the holder there is a grid 5, at the bottom of a water reservoir 6. The lugs 4 are also attached thereto.

DESCRIPTION OF PREFERRED EMBODIMENT

Figure 1:
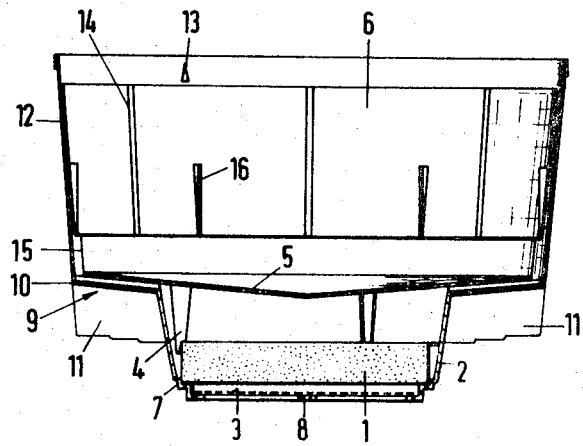
FIG. 1 is a vertical section of a coffee filter having a water reservoir according to the invention.
Figure 2:
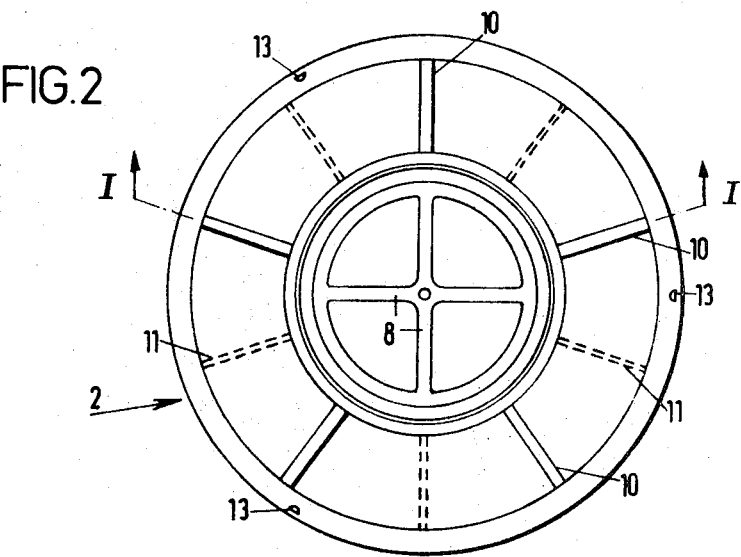
FIG. 2 is a top view of the coffee holder of FIG. 1.

The coffee tablet 1 has the shape of, at least at the bottom, a substantially flat disc and is fittingly arranged along the lower edge in a continuous edge 7 in the tablet holder 2 in such a manner that no water can pass along the periphery of the tablet. The lower face of the coffee tablet is spaced some distance (0.5–2 mm) from the filter element 3, which bears on a bearing cross 8.

The upper face of the tablet may be profiled for a better control of the moistening phase.

The tablet holder extends conically upwardly from the support edge 7, so that the tablet has at least 1–2 mm space on the top to expand radially. Contiguous to the wall of this ex-traction chamber there is on the top a slightly upwardly inclined wall 9 having five radially extending recesses 10. The wall 9 has on the lower side five wings 11 having a stepped configuration on the lower side for centering the coffee filter on a cup. The wall 9 extends into an upwardly diverging wall 12 with snapping lugs 13. The wall of the water reservoir 6 bears against the wall 12 and is retained by the lugs 13.

In the wall of the water reservoir there are a number of vertical slots 14 extending to a trapped portion 15. The bottom of the water reservoir 6 with grid 5 is slightly conical in downward direction. Gases and vapors which cannot easily escape through the small holes in the grid 5 deflect laterally via the recesses 10, the space around the trapped portion 15 and the slots 14. A number of stacking lugs 16 are arranged on the inner wall of the water reservoir.

The coffee tablet is prepared by compression of ground and roasted coffee having a grinding size division of:

13 percent $> 0.5$ mm
56 percent $< 0.5$ and $> 0.315$ mm
18 percent $< 0.315$ and $> 0.16$ mm
7 percent $< 0.16$ and $> 0.10$ mm
6 percent $< 0.10$ mm To prevent disintegration of the table owing to internal pressure build-up through released $CO_2$, the coffee to be compressed may maximally contain about 0.3 percent by weight of $CO_2$. Besides, the $CO_2$ content may not drop below 0.15 percent by weight to prevent too rapid oxidative decay of the coffee. The compression of the coffee takes place at the lowest possible temperature, maximally 30° C. It has appeared that when compressing, possibly with an inert gas, at a pressure of 200–750 kg/cm$^2$, dependent on the coffee type applied, a suitable filter tablet with desired moistening and extraction time is obtained if the tablets are compressed with an average height-diameter ratio between 1:4 and 1:8. With such a tablet an extraction yield between 20 and 30 percent can be obtained if the water-coffee ratio ranges between 30 and 10. Thus, for example, with a water-coffee ratio between 20 and 14 and a height-diameter ratio of the tablet of 1:6 an extraction yield between 22 and 26 percent was obtained. If use is made of water having a temperature between 80° and 100° C a brew of the desired concentration and of sufficiently high temperature can be obtained if the narrow ranges of moistening and extraction time are taken into account. The coffee brew cannot be adversely influenced by preceding handlings with the coffee filter. In a filter with loose coffee the coffee easily sags to one side, as a result of which the filtration is not optimal.

For a normal cup of coffee about 140 cm$^3$ hot water is poured in the water reservoir 6, the grid 5 insuring a good distribution of the water over the tablet to be moistened. The total volume of the extraction chamber in the tablet holder 2 is, dependent on the properties of the brew, about three times the volume of the coffee table 1, in such a manner that the swollen brew fills the space almost completely. If the water is poured on, the coffee tablet initially prevents the water from percolating, while the coffee particles swell owing to the moistening. About after one minute the percolation of water starts.

The openings in the grid 5 are slightly funnel-shaped. The grid contains at least 50 small holes having a diameter of maximally 0.5 mm. The dimensions are such that the coffee in the water reservoir 6 is almost completely prevented from floating. By keeping the narrowest portion of the openings on the tablet side of the grid, loosened coffee parties which possibly come into the openings and which expand therein when moistened, will float in the water and will not clog the grid. Since the fine, ground coffee is compressed, almost no loose coffee particles will reach the filter bottom. Only after the moistening phase is there question of separate coffee particles, but these particles have meanwhile increased to three times their initial volume, so that a much coarser filter bottom than is necessary for loose coffee of the same grinding fineness can be applied. I has appeared that the material used for tea bags is particularly suitable to serve as a filter bottom. This so-called "heat-sealable tea bag paper" of 17 g/m$^2$ is for example marketed by Messrs. Bolloré in France (type 1,000 K T) or Crompton in Great Britain. By employing such a relatively coarse filter bottom the percolating or extraction time is mainly determined by the coffee tablet and the coffee particles, as well as the shape of the tablet holder and not by the filter bottom.

Figure 3:
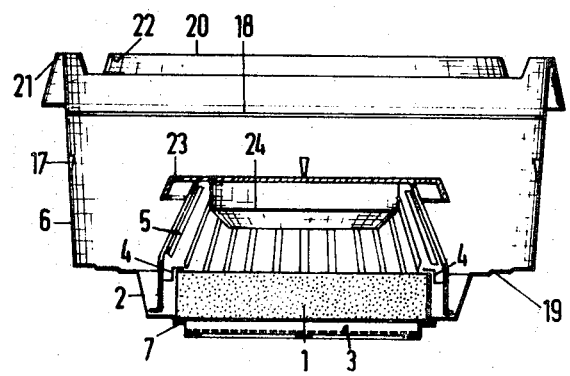
FIG. 3 is substantially a vertical section of another construction of a coffee filter.

The coffee filter shown in FIG. 3, having a basket-shaped extraction chamber, is provided with a coffee tablet 1 in the tablet holder 2', which is provided in the water reservoir 6. This water reservoir is provided with a continuous edge 7', against which the coffee tablet bears sealingly. The tablet holder is provided with lugs 4' for retaining the coffee tablet, while the wall extends slightly conically and is provided with longitudinal slots having a maximum width of 0.2 mm. This part serves as a grid 5'. The tablet holder forms part of the water reservoir 6', which reservoir has a trapped, conical wall, with stacking lugs 17 for stacking with another coffee holder and an internal edge 18 which determines the water level in the example 140 cm$^3$. It is observed that in this example the tablet has a diameter of 44 mm and an average height of 8 mm, while the total height of the tablet holder is 23 mm.

It has appeared that a compressed tablet having a diameter of 44 mm even shows a diameter increase of about 1 mm within 24 hours after compression. By placing the tablet directly after compression in the continuous edge 7' a very good water sealing along the lower edge of the tablet is obtained, partly owing to this expansion. The reservoir is provided with an annular pilot surface 19, with which the filter element can be centered on a coffee cup, while in the annular pilot surface there are a few radial slots not shown for venting the coffee cup. The water reservoir is closed on the top by a possibly transparent cover 20 having an outer annular pilot surface 21, with which the cover is centered on the water reservoir and an inner annular pilot surface 22, between which, in the reverse position of the cover, the lower side of the filter can come to rest after use, so that the cover serves as a saucer.

On top of the coffee holder 2' there is provided a cap 23 partly extending over the slots in the grid 5. Below the edge of this cap an air cushion is maintained, so that when the water is poured on, the upper ends of the grid slots remain active for venting and for the gas discharge. The top of the coffee holder has an insert 24 to reduce the central space at the top of the coffee holder. If ground coffee can also deposit there, it appears that it is less or hardly extracted. Owing to the different shape of the coffee holder and the position of the grid slots the filter shown in FIG. 3 provides a less bitter, lighter flavor of the brew than the filter shown in FIG. 1, in which the ground coffee is almost completely vertically percolated.

The water reservoir and the tablet holder may be manufactured by injection molding of polystyrene 466 i of B.A.S.F., for instance with a wall thickness of 0.6 mm. Of course also different materials are suitable, provided they resist water of 95–98° C. The filter assembly according to the invention is very well suitable for a disposable packing.

It is observed that the invented method and the filter applied can also be used for making beverages other than coffee, for instance, tea, cocoa or the like. The compressed tablet may also comprise additives, like sugar or milk powder.

What is claimed is:

1. A coffee filter comprising a holder for ground coffee, said holder having a filter bottom, a reservoir mounted on the top of said holder and adapted to receive a certain quantity of preheated water, said filter being adapted to be positioned above a collecting basin for the coffee brew, said holder having means adapted to receive and closely embrace a pressed tablet of roasted and ground coffee in a liquid-tight peripheral relation therewith effective to prevent any liquid from flowing between the edge of said tablet and the holder.

2. A coffee filter according to claim 1, wherein the last mentioned means includes means operable for holding a coffee tablet at a slight height above the lower edge of the periphery of said holder and is kept spaced from said filter bottom.

3. A coffee filter according to claim 1 characterized in that the holder for ground coffee has approximately three times the volume of the pressed coffee tablet.

4. A coffee filter according to claim 1, characterized in that said filter bottom has such a porosity that water-swollen coffee particles can not precisely pass.

5. A coffee filter according to claim 1, characterized in that the coffee holder is separated from the water reservoir by a grid having openings of which the smallest size is in the order of magnitude of 0.2–0.5 mm.

* * * * *